UNITED STATES PATENT OFFICE.

RAYMOND B. PRICE, OF NEW YORK, N. Y., ASSIGNOR TO RUBBER REGENERATING COMPANY, A CORPORATION OF INDIANA.

PROCESS OF TREATING RUBBER AND RUBBER-LIKE MATERIALS.

1,158,843.  Specification of Letters Patent.  Patented Nov. 2, 1915.

No Drawing.  Application filed November 15, 1913. Serial No. 801,130.

*To all whom it may concern:*

Be it known that I, RAYMOND B. PRICE, a citizen of the United States, residing in the city of New York, county and State of New York, have invented a certain new and useful Process of Treating Rubber and Rubber-Like Materials, of which the following is a full, clear, and exact disclosure.

This invention relates to the treatment of rubber, rubber compounds and rubber-like materials, such as gutta percha, balata, and the like, hereinafter conveniently referred to as rubber.

The object of the invention is to subject the rubber material to the influence of a vacuum during any of the stages of manufacture that may be desired. The result of such a treatment is to enable a rubber-containing article to be manufactured of vastly superior characteristics.

Unvulcanized rubber ordinarily contains associated air, which if allowed to remain during vulcanization produces a decidedly inferior article. The air present may be due to several causes. The rubber in itself is more or less porous and for this reason alone air is incorporated in the mass somewhat generally. Then again, in working the rubber up, as for instance in the masticating and compounding process, the material is repeatedly laid or folded upon itself with the result that air is entrapped between the layers or folds, forming blisters near the surface or cavities in the interior of the mass. Similar entrapping of air also occurs when articles are built up of layers of rubber or rubber and fabric in the manufacture of tires, footwear and similar articles; also where sheet rubber is rolled up preparatory to its passage through rollers in the making of calendered stock. In fact, air is incorporated during any kneading action of the rubber mass. Air may also be brought into association with the mass on account of being present in the ingredients used, for instance, whiting when mixed with rubber may contain more or less absorbed air; the fabric used with rubber may likewise contain air. It will thus be seen that the causes for the air found in rubber are many. When the vacuum is used it not only draws the associated air out of the material, but also prevents any air from returning. Rubber may therefore be subjected to the action of the vacuum, although there is no air incorporated with it at the time, the object of the vacuum being in such cases to prevent the harmful results that would follow if air were allowed to be present as a surrounding medium.

While the present application is intended to cover the process of subjecting rubber to the influence of a vacuum in its broadest aspect, mention should, however, be made that precautionary steps may be taken, when deemed necessary, to seal the rubber or otherwise treat it to prevent air from re-entering after it has been subjected to the action of a vacuum and prior to its vulcanization. Most of the steps usual in the treatment of the rubber, such, for instance, as subjecting it to the pressure of the rolls, or to the pressure necessary in the making of tubing, result in compacting the rubber, when the vacuum is used. This compacting action destroys the pockets and cavities previously occupied by air, thereby making the material sufficiently air-resisting to enable it to be vulcanized in this condition and thereby obtain the compact, homogeneous material sought. In other instances, however, it may be advisable to seal the article to prevent the return of air when the vacuum is broken. For instance, in manufacturing rubber footwear the article may be inclosed in an air-proof yielding covering after it has been subjected to the action of the vacuum. In such instances, when the vacuum is broken, the atmospheric or other pressure upon the yielding covering may be relied upon to compact the article to make it sufficiently air-resisting to enable the covering to be removed with safety and the article vulcanized.

Rubber to be best suited for the many purposes to which it is put should be first reduced to a compact homogeneous mass and when air is incorporated in it in any marked degree the rubber will be unfit for such uses. Such rubber is obviously poorly suited for that large class of products intended to be air or water proof. Blisters can be detected on the surface, and in the manufacture of some articles such as overshoes and tires, the blisters are punctured, the air pressed out and the thin outer wall pressed down upon the wall opposite. But this is a slow, tedious and expensive expedient. The interior holes, however, are entirely latent and generally do not manifest themselves until the article gives way or breaks down on account of these defects. In can easily be understood what the result will be in the case of elastic threads and like articles of small cross-section made from porous stock or stock containing air holes. Such defects produce an unsound or what might better be termed a porous substance, in that it lacks the strength which the material itself would possess if formed compact and homogeneous. It resembles in this regard a casting of inherently strong material but made weak or porous by the presence of blow holes.

Many of the usual treatments to which the rubber is subjected, as for instance, those treatments which exert a pressure upon the rubber and which may be conveniently termed compacting treatments, necessarily tend to work the air out of the mass. This, however, is of no avail when the treatment is carried out in a surrounding atmosphere, for the working of the rubber also tends to incorporate fresh supplies of air in the mass so that in the end the same air-containing product is the result. When these different treatments are carried out in the absence of air, that is to say, in the presence of a highly attenuated atmosphere approximating a vacuum, different results follow and a different product is obtained. With the use of the vacuum the air within the mass is worked out as before, but more rapidly on account of the drawing action of the vacuum that is maintained, and as there is no air surrounding the mass there is no possibility of air being incorporated. When the vacuum is used the compacting nature of the different treatments is free to act to produce a compact mass free from air holes and other like defects. The temperature of the mass may be regulated as desired while under the influence of the vacuum to produce the best results. It is all important to obtain a mass of rubber of this standard and the beneficial results can only be appreciated by comparing articles as usually made with those made according to my invention.

In referring to the different treatments, it is to be understood that reference is made in each instance to rubber that is to be vulcanized whether it be prior to, during or subsequent to the introduction of the vulcanizing or other ingredients. The term "rubber" is intended to include rubber alone or with other materials, rubber compounds, rubbed substitutes, reclaimed rubber, and in fact any substance that would commonly be termed rubber and which has the characteristic of associating itself with air with the attendant detrimental results. The usual vulcanizing treatment, on account of the attendant heat, augments the harmful results following the presence of air by causing the incorporated air to expand. This expansion is facilitated by the soft condition of the mass during the vulcanizing process. It will thus be seen that vulcanizable articles are peculiarly adapted for subjection to the vacuum treatment.

Having thus described my invention, what I claim and desire to protect by Letters Patent is:

1. The method of treating vulcanizable plastics preparatory to their vulcanization which consists in incorporating a vulcanizing agent therewith and subjecting the mass during or subsequent to the incorporation of said agent, simultaneously to a kneading action and to the action of a vacuum.

2. The method of treating vulcanizable plastics preparatory to their vulcanization which consists in incorporating a vulcanizing agent therewith and subjecting the mass during or subsequent to the incorporation of said agent, simultaneously to the action of rolls and to the action of a vacuum.

3. The method of treating vulcanizable plastics preparatory to their vulcanization which consists in incorporating a vulcanizing agent therewith, subjecting the mass during or subsequent to the incorporation of said agent, simultaneously to a kneading action and to the action of a vacuum, and finally subjecting the exposed superficial area of the mass to a sealing pressure.

4. The method of treating vulcanizable plastics preparatory to their vulcanization, which consists in incorporating a vulcanizing agent therewith, subjecting the mass during or subsequent to the incorporation of said agent, simultaneously to a kneading action and to the action of a vacuum, enveloping the mass in a yielding covering and subjecting the exterior of said covering to pressure.

5. The method of treating vulcanizable plastics preparatory to their vulcanization, which consists in incorporating a vulcanizing agent therewith, subjecting the mass during or subsequent to the incorporation of said agent simultaneously to a mechanical compacting treatment and to the action of an enveloping vacuum.

Signed at the city of New York, county and State of New York, this 14th day of November, 1913.

RAYMOND B. PRICE.

Witnesses:
 JOHN J. CASEY,
 CHARLOTTE M. SCHULE.

Copies of this patent may be obtained for five cents each, by addressing the "Commissioner of Patents, Washington, D. C."